(12) United States Patent
Mochida et al.

(10) Patent No.: US 10,158,265 B2
(45) Date of Patent: Dec. 18, 2018

(54) EMBEDDED PERMANENT MAGNET TYPE ROTATING ELECTRIC MACHINE

(71) Applicant: FUJI ELECTRIC CO., LTD., Kawasaki-shi (JP)

(72) Inventors: Toshiharu Mochida, Fujimi (JP); Akio Toba, Hino (JP); Hiroshi Shimada, Hino (JP); Hirofumi Nishimura, Suzuka (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 261 days.

(21) Appl. No.: 14/850,183

(22) Filed: Sep. 10, 2015

(65) Prior Publication Data

US 2015/0380995 A1 Dec. 31, 2015

Related U.S. Application Data

(63) Continuation of application No. PCT/JP2014/055225, filed on Mar. 3, 2014.

(30) Foreign Application Priority Data

Apr. 1, 2013 (JP) .................. 2013-076053

(51) Int. Cl.
*H02K 1/27* (2006.01)
*H02K 16/02* (2006.01)

(52) U.S. Cl.
CPC ......... *H02K 1/2746* (2013.01); *H02K 1/2766* (2013.01); *H02K 16/02* (2013.01); *H02K 2201/03* (2013.01); *H02K 2213/12* (2013.01)

(58) Field of Classification Search
CPC .... H02K 1/2746; H02K 1/2766; H02K 16/02; H02K 2201/03; H02K 2213/12
(Continued)

(56) References Cited

U.S. PATENT DOCUMENTS

| 4,354,126 A | * | 10/1982 | Yates | ................... | H02K 1/2773 |
| | | | | | 310/156.59 |
| 4,568,846 A | * | 2/1986 | Kapadia | ............... | H02K 1/2773 |
| | | | | | 310/156.83 |

(Continued)

FOREIGN PATENT DOCUMENTS

| CN | 101855808 A | 10/2010 |
| CN | 202424339 U | 9/2012 |

(Continued)

*Primary Examiner* — John K Kim
(74) *Attorney, Agent, or Firm* — Rabin & Berdo, P.C.

(57) ABSTRACT

An embedded permanent magnet type motor, which has one pole configured of two permanent magnets and has a plurality of poles of permanent magnets embedded in a rotor, includes a rotor whose magnet embedding holes communicate with a rotor outer periphery. The rotor has, between adjacent poles, a q-axis projection projecting in a direction away from a rotor rotation center. The magnet embedding holes are disposed so as to form an inverted V shape. An outer peripheral edge portion on the outer side of the permanent magnets has a curvature radius smaller than the distance from a rotation center axis to a rotor outermost peripheral portion. Circular intermediate plates of an outside diameter larger than the outside diameter of rotor steel plates are provided in intermediate positions in the rotor in a rotor rotation axis direction.

17 Claims, 8 Drawing Sheets

(58) Field of Classification Search
USPC ............. 310/156.37, 156.53, 156.54, 156.56
IPC ....................................................... H02K 1/27
See application file for complete search history.

(56) References Cited

U.S. PATENT DOCUMENTS

| | | | | |
|---|---|---|---|---|
| 5,010,266 | A * | 4/1991 | Uchida | H02K 1/2773 |
| | | | | 310/156.22 |
| 5,039,897 | A * | 8/1991 | Iwamatsu | H02K 1/2773 |
| | | | | 310/156.18 |
| 6,144,131 | A * | 11/2000 | Hollenbeck | H02K 1/276 |
| | | | | 310/156.53 |
| 8,339,005 | B2 * | 12/2012 | Rebollo Gomez | H02K 1/278 |
| | | | | 310/156.18 |
| 8,362,668 | B2 | 1/2013 | Takahashi et al. | |
| 9,461,510 | B2 | 10/2016 | Lillington | |
| 2002/0047426 | A1 * | 4/2002 | Pop, Sr. | H02K 1/2773 |
| | | | | 310/156.08 |
| 2002/0175583 | A1 | 11/2002 | Kikuchi et al. | |
| 2005/0200223 | A1 | 9/2005 | Tajima et al. | |
| 2010/0066191 | A1 * | 3/2010 | Bahr | H02K 1/278 |
| | | | | 310/156.38 |
| 2010/0301697 | A1 * | 12/2010 | Takahashi | H02K 1/2766 |
| | | | | 310/156.53 |
| 2013/0119808 | A1 * | 5/2013 | Hirokawa | H02K 1/2773 |
| | | | | 310/156.43 |
| 2014/0246938 | A1 * | 9/2014 | Lillington | H02K 1/2746 |
| | | | | 310/156.01 |
| 2015/0380995 | A1 * | 12/2015 | Mochida | H02K 1/2766 |
| | | | | 310/156.53 |

FOREIGN PATENT DOCUMENTS

| | | |
|---|---|---|
| DE | 4423840 A1 | 1/1996 |
| EP | 2216883 A1 | 8/2010 |
| JP | 2002-191143 A | 7/2002 |
| JP | 2006-158037 A | 6/2006 |
| JP | 2007-244017 A | 9/2007 |
| JP | 2008-099479 A | 4/2008 |
| JP | 2011-004480 A | 1/2011 |
| WO | WO 2013-044293 A1 | 4/2013 |

* cited by examiner

EMBEDDED PERMANENT MAGNET TYPE ROTATING ELECTRIC MACHINE

This application is a continuation under 35 U.S.C. 120 of International Application PCT/JP2014/055225 having the International Filing Date of Mar. 3, 2014, and having the benefit of the earlier filing date of Japanese Application No. 2013-076053, filed Apr. 1, 2013. Each of the identified applications is fully incorporated herein by reference.

BACKGROUND

Technical Field

The present invention relates to a rotating electric machine, such as a motor or a generator, having a rotor, and in particular to an embedded permanent magnet type rotating electric machine having permanent magnets embedded in the rotor.

Background Art

FIGS. 7A and 7B are sectional views showing a configuration of a rotor of an IPM motor which is one example of a heretofore known embedded permanent magnet type rotating electric machine, and FIG. 7C is a diagram showing an outer peripheral surface of the rotor. The IPM motor of the heretofore known example is disclosed in PTL 1. The IPM motor is such that two permanent magnets 13a and 13b disposed in a V shape so as to expand toward the outer side of a rotor 10 form one pole, and that a plurality of sets of the two permanent magnets 13a and 13b are embedded in the rotor 10, thus forming a plurality of poles. Also, the rotor 10 is configured by alternately stacking stacked steel plates 11 shown in FIG. 7A and stacked steel plates 12 shown in FIG. 7B, a stacked steel plate of one kind on a stacked steel plate of another, as shown in FIG. 7C, or several stacked steel plates of one kind on several stacked steel plates of another.

As shown in FIG. 7A, two holding hole portions 18a and 18b, two cavity portions 14a and 14b, and two cavity portions 15a and 15b are formed as one pole, and a plurality of sets of the portions are formed, in the stacked steel plate 11. Specifically, the two holding hole portions 18a and 18b, disposed in a V shape, which hold the two permanent magnets 13a and 13b, the two cavity portions 14a and 14b, disposed in a portion (the central portion of the V) between the two holding hole portions 18a and 18b, which communicate respectively with the holding hole portions 18a and 18b, and the two cavity portions 15a and 15b, each disposed in a portion (each end portion of the V) between the holding hole portion and another adjacent pole, which communicate respectively with the holding hole portions 18a and 18b, are formed as one pole.

The holding hole portion 18a, the cavity portion 14a, and the cavity portion 15a form one continuous region (hole), while the holding hole portion 18b, the cavity portion 14b, and the cavity portion 15b also form one continuous region (hole), and each region only has to be punched as one hole when punching the stacked steel plate 11. By the punching, side bridges 19a and 19b are formed on the outer edge sides of the cavity portions 15a and 15b.

Also, as shown in FIG. 7B, two holding hole portions 18a' and 18b', two cavity portions 14a' and 14b', and two notch portions 16a and 16b are formed as one pole, and a plurality of sets of the portions are formed, in the stacked steel plate 12. The holding hole portion 18a' and 18b' and cavity portions 14a' and 14b' in the stacked steel plate 12 are the same respectively as the holding hole portions 18a and 18b and cavity portions 14a and 14b in the stacked steel plate 11. Specifically, the two holding hole portions 18a' and 18b', disposed in a V shape, which hold the two permanent magnets 13a and 13b, the two cavity portions 14a' and 14b', disposed in a portion (the central portion of the V) between the two holding hole portions 18a' and 18b', which communicate respectively with the holding hole portions 18a' and 18b', and the two notch portions 16a and 16b, disposed so as to overlap respectively with the cavity portions 15a and 15b, which communicate respectively with the holding hole portions 18a' and 18b' and open into the outer edge of the stacked steel plate 12, are formed as one pole. The notch portions 16a and 16b are disposed so as to include therein the respective cavity portions 15a and 15b, and thereby disposed so as to overlap with the respective cavity portions 15a and 15b.

The holding hole portion 18a', the cavity portion 14a', and the notch portion 16a form one continuous region (notch), while the holding hole portion 18b', the cavity portion 14b', and the notch portion 16b also form one continuous region (notch), and each region only has to be punched as one notch when punching the stacked steel plate 12.

A center bridge 19c exists between the cavity portion 14a and cavity portion 14b in the stacked steel plate 11 and between the cavity portion 14a' and cavity portion 14b' in the stacked steel plate 12. In each stacked steel plate 11 and 12, a region on the inner peripheral side of the permanent magnets and a region on the outer peripheral side connect together via the center bridge 19c.

Further, when the stacked steel plates 11 and 12 are alternately stacked one on another, the outer peripheral surface of the rotor 10 is of the appearance shown in (c) of FIG. 7, and the notches 16a and 16b, forming their respective rows, are disposed every other stacked steel plate.

In the heretofore known example, as the stacked steel plates 11 and the stacked steel plates 12 are alternately stacked, and magnetic fluxes pass through the notch portions 16a and 16b in the stacked steel plates 12, it is possible to reduce magnetic short circuit, even without reducing the width of the side bridges 19a and 19b, in the stacked steel plates 11. Specifically, as each stacked steel plate 12 has the notch portions 16a and 16b, the total sectional area wherein the sectional areas of cores, each of which is between the permanent magnets and rotor outer peripheral surface, in all the steel plates are summed up (that is, the total sectional area wherein the sectional areas of the side bridge 19a and 19b portions are summed up) becomes ½, as a result of which magnetic short circuit is reduced.

Also, in the stacked steel plate 12, as each notch portion 16a and 16b is formed in a portion between the holding hole portion and another adjacent pole, and no core exists, the magnetic resistance in the notch portions 16a and 16b can be made larger than the magnetic resistance in the side bridges 19a and 19b. Further, as the stacked steel plates 11 and the stacked steel plates 12 are alternately stacked, it is possible to make the magnetic resistance larger than in the case of using only the stacked steel plates 11. Consequently, by reducing magnetic short circuit in the notch portions 16a and 16b, it is possible to suppress a magnetic flux leakage and supply many magnetic fluxes to a stator side, and thus possible to improve motor efficiency. Furthermore, in the stacked steel plate 12, as the core exists in a portion through which d-axis magnetic fluxes and q-axis magnetic fluxes pass, it is possible to maintain a desired reluctance torque.

With the heretofore described configuration, even when it is necessary to form the side bridges 19a and 19b to a predetermined width for punching quality and centrifugal force resistance, it is possible, owing to the existence of the notch portions 16a and 16b, to increase magnetic resistance and suppress a magnetic flux leakage while securing a predetermined width as the width of the side bridges 19a and 19b.

CITATION LIST

Patent Literature

PTL 1: JP-A-2011-4480

However, the heretofore known embedded permanent magnet type rotating electric machine heretofore described is such that in the manufacturing process thereof, there is a case in which the rotor is placed directly on a floor with the rotor rotation axis brought to a level. At this time, there is the problem that there is fear that stress concentrates on the center bridge, thus damaging the rotor.

SUMMARY

The invention, having been contrived bearing in mind the above kinds of circumstances, has for its object to provide an embedded permanent magnet type rotating electric machine including means which protects the rotor against damage.

The invention provides an embedded permanent magnet type rotating electric machine which has one pole configured of two permanent magnets and has a plurality of poles of permanent magnets embedded in a rotor, the rotating machine being characterized in that one or a plurality of disk-shaped intermediate plates, the outer periphery of which is substantially circular, are each disposed in an intermediate position between adjacent rotor steel materials in a rotor axis direction.

According to this invention, when the rotor is placed directly on a floor with a rotor rotation axis brought to a level in the process of manufacturing the rotor, the rotor is supported by the intermediate plates. Consequently, it is possible, when manufacturing the rotating electric machine, to prevent a large stress from being applied to each portion of the rotor, and protect the rotor against damage.

In a preferred aspect, magnet embedding holes in each rotor steel material, which house the permanent magnets, communicate with a rotor outer periphery.

According to this aspect, as the configuration of causing the magnet embedding holes to communicate with the rotor outer periphery is adopted, and there is no side bridge, a region of the rotor on the outer side of center bridges in a centrifugal direction is supported by only the center bridges. However, as the rotor has the intermediate plates, the rotor is supported by the intermediate plates when the rotor is placed directly on a floor with the rotor rotation axis brought to a level in the process of manufacturing the rotor, and it is thus possible to relax the stress applied to the center bridges.

In a preferred aspect, the outside diameter of the intermediate plates is larger than the outside diameter of the rotor steel materials. Also, the intermediate plates are configured from a metal material, more preferably, an iron-based metal material. As the material is superior in elasticity and toughness, it is possible to protect the intermediate plates themselves against damage, and protect the rotor against damage.

In a preferred aspect, a non-magnetic film is formed on the surface of the intermediate plates. According to this aspect, it is possible to suppress a magnetic flux leakage.

Also, in a preferred aspect, the non-magnetic film is non-conductive. According to this aspect, it is possible to prevent eddy current, and prevent the rotor from overheating.

In place of forming the non-magnetic film on the surface of the intermediate plates, a non-magnetic thin plate may be disposed on a side in the rotor axis direction of each intermediate plate. Also, the non-magnetic thin plate in this case may be non-conductive.

In a preferred aspect, the intermediate plates each have no hole other than a hole through which to pass a shaft of the rotor. According to this aspect, it is possible to make the intermediate plates very strong.

In another preferred aspect, the intermediate plates each have holes, different in shape and size from the magnet embedding holes, at least partial regions in which are opposed to regions in the magnet embedding holes of the rotor steel material. According to this aspect, as the holes are made in the intermediate plates, it is possible to increase the magnetic resistance of a path from the permanent magnets back to the rotor steel material, in which the permanent magnets are housed, by way of the intermediate plates, and reduce leakage magnetic fluxes. Also, as the magnet embedding holes provided in the rotor steel materials on both sides of each intermediate plate communicate with each other via the holes of the intermediate plates, ventilation is good.

In another preferred aspect, the holes provided in the intermediate plates are holes having a shape and size such that the permanent magnets embedded in the magnet embedding holes can be inserted in the holes. In this aspect, the permanent magnets are movable in the rotor rotation axis direction. Consequently, depending on the configuration of the rotor, it may be easy to assemble the rotor.

In another preferred aspect, the holes provided in each intermediate plate are holes having a shape and size such that each hole includes one portion of each of the permanent magnets embedded in the magnet embedding holes, and that the remaining portion of each permanent magnet protrudes outside the hole. In this aspect, the intermediate plates function as restraining a movement of the permanent magnets in the rotor rotation axis direction. Consequently, depending on the configuration of the rotor, it may be easy to assemble the rotor.

DETAILED DESCRIPTION

Figure 1:
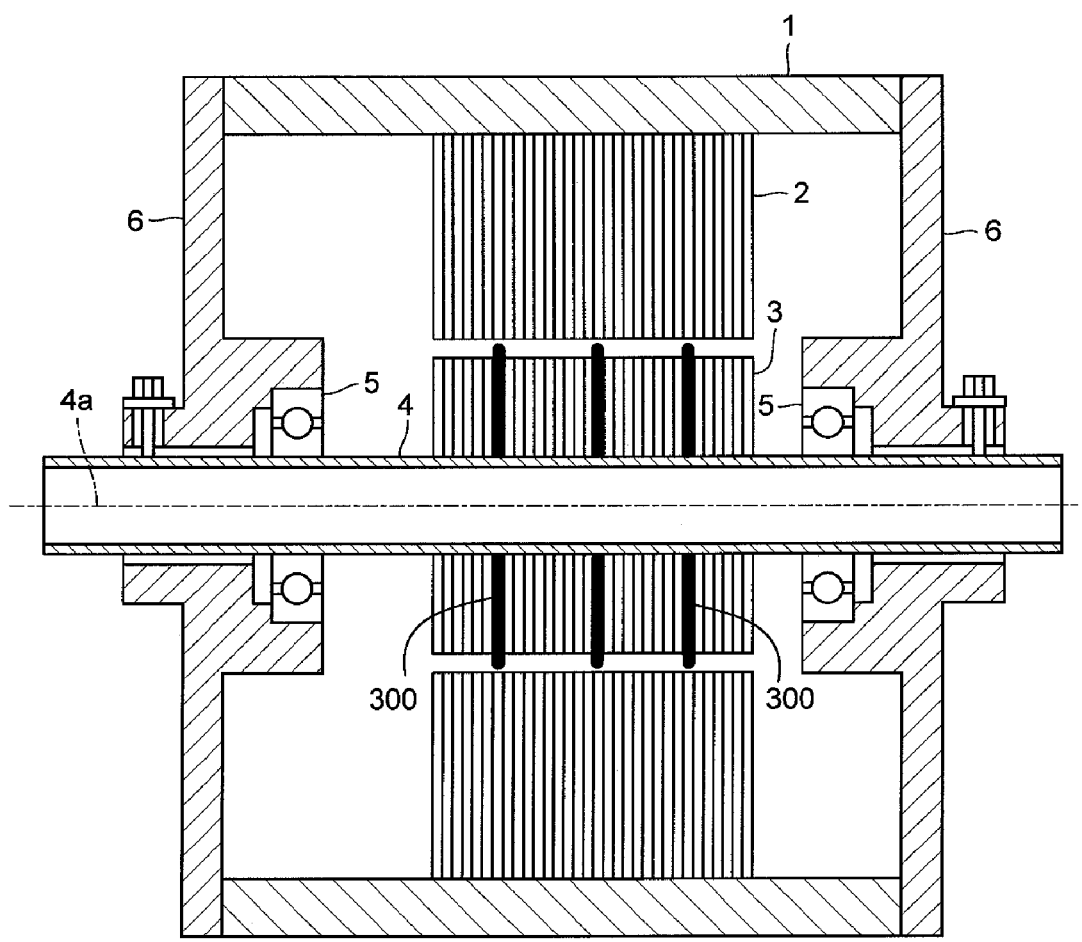
FIG. 1 is a vertical sectional view showing a configuration of an embedded permanent magnet type rotating electric machine which is a first embodiment of the invention.

Hereafter, a description will be given, referring to the drawings, of embodiments of the invention.

First Embodiment

FIG. 1 is a vertical sectional view showing an overall configuration of an embedded permanent magnet type rotating electric machine which is a first embodiment of the invention. In FIG. 1, a frame 1 is a housing which covers the whole of the embedded permanent magnet type rotating electric machine, and is configured from iron, aluminum, stainless, or the like. A hollow cylindrical stationary side core 2 is provided on the inner side of the frame 1. The stationary side core 2 is formed by stacking silicon steel plates. A hole is provided in the stationary side core 2, and a stator winding made of a copper wire or the like is inserted in the hole (the illustration is omitted). A rotor 3 which is a rotary side core is inserted on the inner side of the stationary side core 2 with a predetermined gap sandwiched between the stationary side core 2 and the rotor 3. The rotor 3 is formed by stacking silicon steel plates. There is also a case in which the rotor 3 is configured by cutting a simple iron block. A shaft 4 made of iron or the like passes through the center of the rotor 3. Ideally, the central axis of the shaft 4 is a rotation center axis 4a of the rotor 3. Further, the shaft 4 is supported by shields 6 provided, one at each of two front and rear ends of the frame 1, via rolling bearings 5 made of bearing steel or the like.

In this example, the embedded permanent magnet type rotating electric machine is a motor. In the motor, the rotor 3 rotates around the rotation center axis 4a by being energized by rotating magnetic fields created by the stator winding (not shown).

Figure 2:
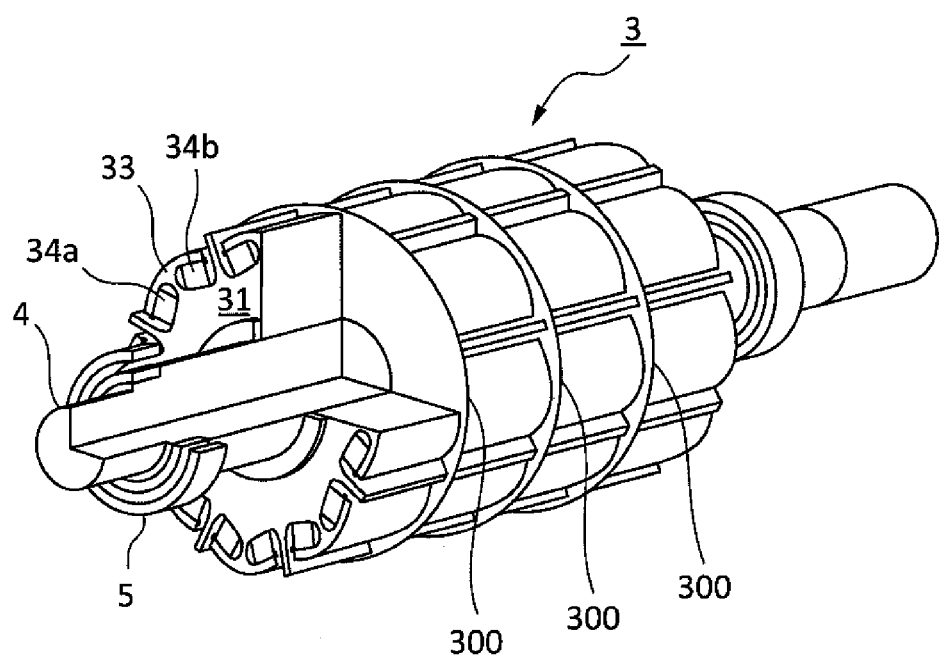
FIG. 2 is a perspective view showing a configuration of a rotor in the embodiment.
Figure 3:
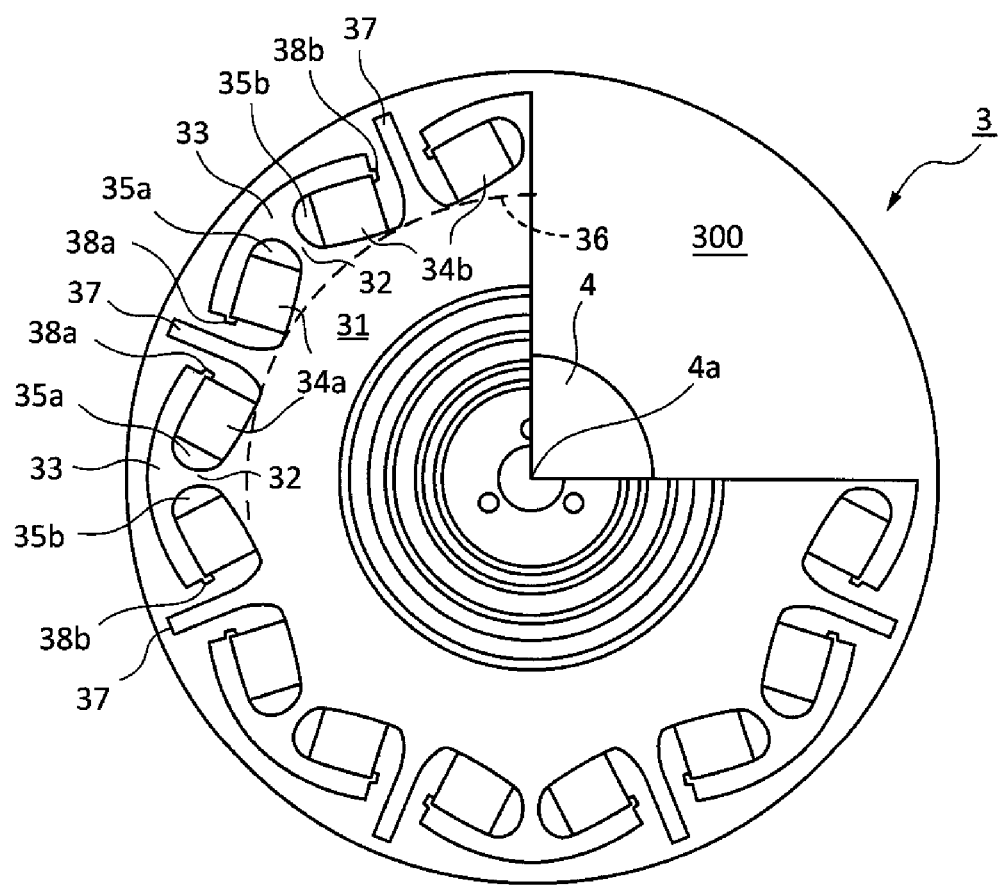
FIG. 3 is a front view showing the configuration of the rotor in the embodiment.

A feature of the embodiment lies in the configuration of the rotor 3, specifically, in intermediate plates 300 provided in the rotor 3. FIG. 2 is a perspective view showing a configuration of the rotor 3 in the embodiment. Also, FIG. 3 is a front view of the rotor 3 seen from the direction of the rotation center axis 4a. FIGS. 2 and 3 each show a configuration of the rotor 3 with one portion thereof cut out by two planes perpendicular to the rotation center axis 4a, for easy understanding of the configuration of the rotor 3.

The rotor 3 according to the embodiment can be divided broadly into a core portion 31 closer to the rotation center axis 4a, two permanent magnets 34a and 34b provided for each pole, an outer peripheral edge portion 33 of each pole, made of a rotor steel material, which is on the outer side of the permanent magnets 34a and 34b as seen from the rotation center axis 4a, a center bridge 32 of each pole connecting the core portion 31 and outer peripheral edge portion 33, and q-axis projections 37 each provided between two adjacent poles.

One pole's worth of the outer peripheral edge portion 33 has a substantially arc-like section, and connects with the core portion 31, via the center bridge 32, in the center in a rotor rotation direction. The outer peripheral surface of the outer peripheral edge portion 33 has a curvature radius smaller than the distance from the rotation center axis 4a to a rotor outermost peripheral portion. This is because a magnetic field calculation by the present inventors reveals that the harmonic components of torque are reduced by forming the outer peripheral edge portion 33 in this kind of shape, and that the fundamental components of torque generated in the rotor 3 increase by the reduced amount. In this way, the curvature radius of one portion of the outer peripheral edge portion 33, rather than all of the outer peripheral edge portion 33, may be made smaller than the distance from the rotation center axis 4a to the rotor outermost peripheral portion.

A magnet embedding hole 35a in which to hold the permanent magnet 34a and a magnet embedding hole 35b in which to hold the permanent magnet 34b are provided on the inner side of the outer peripheral edge portion 33. The magnet embedding holes 35a and 35b are enclosed from three directions by the outer peripheral edge portion 33, center bridge 32, and core portion 31. The outer peripheral edge portion 33 supports the permanent magnets 34a and 34b to the rotation center axis 4a side against a centrifugal force acting on the permanent magnets 34a and 34b when the rotor 3 rotates. The outer peripheral edge portions 33 corresponding one to each pole are disposed in the rotor rotation direction with a gap sandwiched between one outer peripheral edge portion 33 and an adjacent one. The gap between two adjacent outer peripheral edge portions 33 is positioned in the center between the poles. The magnet embedding holes 35a and 35b communicate with a rotor outer periphery via the gap between the two adjacent outer peripheral edge portions 33.

The magnet embedding holes 35a and 35b are disposed in an inverted V shape. Further, a region (the core portion 31) on the rotation center axis 4a side of the inner peripheral wall of each magnet embedding hole 35a and 35b inclines in a direction away from the rotation center axis 4a toward between the two magnet embedding holes (that is, toward the center bridge 32) with increasing distance from the center between adjacent poles. Therefore, the center bridge 32 is in a position spaced outward in a rotor radial direction from the inscribed circle of all the magnet embedding holes 35a and 35b of the rotor 3.

The q-axis projection 37, passing through the gap between two adjacent outer peripheral edge portions 33, projects in a centrifugal direction (a direction away from the rotation center axis 4a) from a position on the core portion 31 in the center between adjacent poles. The magnet embedding holes 35a and 35b are provided respectively with positioning projections 38a and 38b which restrain the permanent magnets 34a and 34b from moving to the respective q-axis projection 37 sides. The positioning projections 38a and 38b project toward the rotation center axis 4a from regions, of the inner walls of the magnet embedding holes 35a and 35b, which are on the outer side in the rotor radial direction as seen from the permanent magnets 34a and 34b, that is, from the q-axis projection 37 side end portions on the inner side of the outer peripheral edge portion 33. The permanent magnets 34a and 34b are fixed in the magnet embedding holes 35a and 35b while being pressed against the positioning projections 38a and 38b. At this time, an adhesive is used to assist the fixation of the permanent magnets 34a and 34b to the magnet embedding holes 35a and 35b.

In the embodiment, the rotor 3 has the disk-shaped intermediate plates 300, the outer periphery of which is substantially circular, in one or a plurality of positions (three portions in the illustrated example) in the rotor axis direction. The thickness in the rotor rotation axis direction of rotor steel plates partitioned by the intermediate plates 300 is sufficiently large compared with the thickness of the intermediate plates 300. Also, the intermediate plates 300 each have no hole other than a hole through which to pass the shaft 4. Also, the outside diameter of the intermediate plates 300 is larger than the outside diameter of the steel materials of the rotor 3, as shown in the drawings. Further, the intermediate plates 300 are configured from a metal material. More specifically, the intermediate plates 300 are configured from an iron-based metal material such as steel or stainless steel.

In the embodiment, as the intermediate plates 300, plates, on the surface of which a non-magnetic film is formed, are used. Also, the non-magnetic film formed on the intermediate plates 300 is non-conductive. In place of forming the non-magnetic film on the surface of the intermediate plates 300, non-magnetic thin plates may be disposed one on either side in the rotor axis direction of each intermediate plate 300. Also, the non-magnetic thin plates may be non-conductive.

The above is the configuration of the rotor 3 in the embodiment.

The rotor 3 in the embodiment has a configuration wherein the magnet embedding holes 35a and 35b communicate with the rotor outer periphery. There is one feature of the embodiment in the configuration. Hereafter, a description will be given of reasons for adopting the configuration.

The method of assembling a shaft and rotor steel materials using an interference fit such as a shrink fit is commonly used in manufacturing a motor. In this interference fit process, circumferential tensile stress remains in the rotor steel material. This residual stress still remains even while a rotor is rotating rapidly. After the present inventors have made a calculation using a finite element method, it is confirmed that the residual stress is hardly generated on a circumference having the same radius as a portion of the rotor steel material having a hole, a depression, or the like (that is, no stress remains unless in portions, having no hole or depression, which connect in a ring shape).

Meanwhile, when the rotor rotates, in particular, when the rotor rotates rapidly, an enormous centrifugal force is generated in each portion of the rotor. At this time, when the rotor has a center bridge and side bridges, as in a heretofore known example, a large centrifugal stress is generated in the center bridge and side bridges. In this case, tensile stress acts on the center bridge, while shear stress is generated in the side bridges, due to the centrifugal force generated by the rotation of the rotor. Therefore, in order to prevent damage to the rotor due to the rapid rotation, it is necessary to sufficiently increase the strength of the side bridges rather than that of the center bridge, and this point makes the strength design of the rotor difficult.

Also, in the heretofore known example, in order to achieve both the object of reducing leakage fluxes and the object of securing the strength of the rotor, the rotor is configured by combining rotor steel plates with the side bridges and rotor steel plates without the side bridges. Therefore, the rotor of the heretofore known example has the problem of an increase in manufacturing cost or the like.

Therefore, as the configuration of the rotor, the embodiment adopts a configuration wherein the magnet embedding holes 35a and 35b communicate with the rotor outer periphery, that is, a configuration wherein the side bridges in the heretofore known example do not exist. According to the embodiment, as the rotor has no side bridge on the outermost periphery, no assembly residual stress remains on the outermost periphery of the rotor. Stress generated by the centrifugal force when the rotor rotates concentrates on the center bridge, but the stress acting on the center bridge is tensile stress. Also, no residual stress remains in the vicinity of the center bridge, either, by disposing the magnet embedding holes 35a and 35b in an inverted V. Consequently, it is easy to respond so that the center bridge does not sustain damage by adjusting the width of the center bridge, or the like. Moreover, the rotor configuration wherein the magnet embedding holes 35a and 35b communicate with the rotor outer periphery produces great advantages to be described hereafter.

Firstly, unlike the heretofore known example, the rotor steel materials, of the rotor 3 in the embodiment, which are partitioned by the intermediate plates 300 have the same sectional shape when sectioned by any plane perpendicular to the rotor rotation axis. Therefore, the rotor 3 in the embodiment has manufacturing advantages. That is, the rotor 3 according to the embodiment can be cut out of one solid metal blank. Also, even when forming the rotor 3 in the embodiment using stacked steel plates, there is no need to prepare a plurality of kinds of steel plates differing in hole shape, and only steel plates of one kind only have to be prepared. Consequently, it is possible to overwhelmingly hold down the cost of steel plates from the aspect of the investment expenses of an internal punching die for forming steel plates, and also from the aspect of a parts control, as well as from the aspect of a strength and magnetic field design.

Also, the rotor 3 in the embodiment has fewer flux leakage paths than in the heretofore known example having the side bridges. Therefore, it is easy for the magnetic fluxes of the magnets to link with the winding, and this contributes to an increase in torque.

Furthermore, when the magnet embedding holes 35a and 35b are caused to communicate with the rotor outer periphery, the permanent magnets 34a and 34b are supported at a uniform stress over the whole length in the rotor axis direction by the outer peripheral edge portions 33. Therefore, stress is difficult to generate inside the permanent magnets 34a and 34b, and it is thus possible to protect the permanent magnets 34a and 34b against damage.

As another feature of the embodiment, there is the q-axis projection 37. The q-axis projection 37 can produce a strong reluctance torque, thus contributing to an increase in the torque generated in the rotor.

Furthermore, as another feature of the embodiment, there is the shape of the outer peripheral edge portion 33. When irregularities are provided on the outer peripheral surface of the rotor, the harmonic components of torque generated in the rotor can be converted to fundamental components, and it is thus possible to reduce torque pulsations and increase torque. However, in the case of the rotor whose magnet embedding holes do not communicate with the rotor outer periphery and whose outermost periphery continues in a ring shape, as in the heretofore known example, assembly residual stress remains in a ring-shaped region in the vicinity of the rotor outer peripheral surface. Consequently, in the heretofore known rotor, it is difficult to provide irregularities causing the stress concentration on this kind of outermost peripheral surface of the rotor on which the residual stress remains. However, in the embodiment, as the magnet embedding holes 35a and 35b are caused to communicate with the rotor outer periphery, no residual stress remains in the outer peripheral edge portion 33 which is the outermost peripheral region of the rotor 3. Consequently, in the embodiment, in order to increase torque, it is easy to provide irregularities on the outer peripheral surface of the outer peripheral edge portion 33 which is the outermost peripheral region of the rotor 3. Therefore, in the embodiment, the curvature radius of the outer peripheral surface of the outer peripheral edge portion 33 which is on the outer side of the permanent magnets as seen from the rotor rotation center is made smaller than the distance from the rotor rotation center to the rotor outermost peripheral portion. Therefore, in the embodiment, it is possible to reduce torque pulsations generated in the rotor 3 and increase torque.

Also, as another feature of the embodiment, there are the magnet embedding holes 35a and 35b disposed in an inverted V shape. Advantages which can be obtained from the feature will be described as follows.

Firstly, in the process of interference fitting the shaft 4 into the rotor 3, circumferential tensile stress remains in the rotor steel materials. This residual stress decreases with increasing distance from the rotation center axis 4a, but as the connection in a ring shape is severed by the magnet embedding holes 35a and 35b, the residual stress is hardly generated, on the circumference having the same radius as the magnet embedding holes 35a and 35b. Consequently, in the rotor 3 in the embodiment, residual stress resulting from stress concentration is maximum on the circumference of an inscribed circle 36 of the magnet embedding holes 35a and 35b. Meanwhile, when the rotor 3 rotates, tensile stress resulting from a centrifugal force is generated in the center bridge 32. When the magnet embedding holes 35a and 35b are disposed in an inverted V shape, the position of the center bridge 32 is away outward in the rotor radial direction from a position on the inscribed circle 36 in which the residual stress is maximum. In this way, according to the embodiment, as little residual stress resulting from an interference fitting is generated in a region having the center bridge 32 on which tensile stress resulting from a centrifugal force concentrates when the rotor 3 rotates, it is possible to increase the strength of the center bridge 32 when the rotor 3 rotates.

Also, in the embodiment, the positioning projections 38a and 38b are provided on the outer peripheral edge portion 33 which is on the outer side in the radial direction as seen from the permanent magnets 34a and 34b. Consequently, the permanent magnets 34a and 34b are fixed by being pressed against the positioning projections 38a and 38b, and it is thereby possible to prevent the imbalance between the centrifugal forces generated in the two permanent magnets 34a and 34b which form one pole, and prevent the imbalance between the magnetic flux distributions generated by the individual permanent magnets.

Furthermore, as an important feature of the embodiment, there are the intermediate plates 300 provided in intermediate positions in the rotor 3 in the rotor rotation axis direction. In the process of manufacturing the motor, there is a case in which the rotor 3 is placed directly on a floor with the rotor rotation axis brought to a level. At this time, stress concentrates on the center bridge 32. In particular, in the embodiment, the magnet embedding holes 35a and 35b are caused to communicate with the rotor outer periphery, and the outer peripheral edge portion 33 and the permanent magnets 34a and 34b are supported by only the center bridge 32, due to which stress concentrates on the center bridge 32. However, the rotor 3 in the embodiment has the disk-shaped intermediate plates 300, the outer periphery of which is substantially circular, in one or a plurality of positions in the rotor axis direction. Further, the outside diameter of the intermediate plates 300 is larger than the outside diameter of the steel materials of the rotor 3. Therefore, in a condition in which the rotor 3 is placed directly on the floor, the rotor steel materials are supported by the intermediate plates 300, and it is possible to relax stress applied to the center bridge 32. Also, the intermediate plates 300 each have no hole other than the hole through which to pass the shaft 4. Furthermore, the intermediate plates 300 are configured from an iron-based metal material such as steel or stainless steel. Further, the material is rich in elasticity and toughness and high in strength. Therefore, the intermediate plates 300, being very strong against stress, prevent damage to the intermediate plates 300 themselves, and produce the advantage of protecting the rotor steel materials.

Also, in the embodiment, as the intermediate plates 300, plates, on the surface of which a non-magnetic film is formed, are used, meaning that it is possible to prevent the flow of magnetic fluxes in the rotor rotation axis direction, and suppress a magnetic flux leakage. Consequently, it is possible to increase torque generated in the rotor 3 even without making the permanent magnets powerful. Alternatively, as it is possible to generate the same torque even when the quantity of magnets is reduced, it is possible to speed up the motor. Also, in the embodiment, the non-magnetic film formed on the intermediate plates 300 is non-conductive. According to this aspect, it is possible to prevent generation of eddy current, and prevent overheat.

It is possible to obtain the same advantages even when non-magnetic and non-conductive thin plates are disposed one on either side in the rotor axis direction of each intermediate plate 300 in place of forming the non-magnetic film on the surface of the intermediate plates 300.

Second Embodiment

Figure 4:
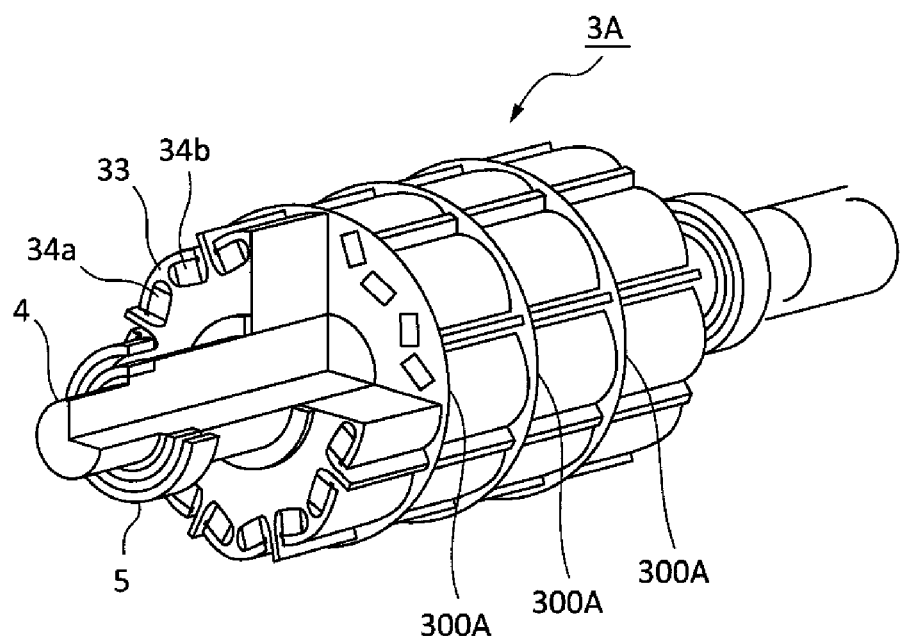
FIG. 4 is a perspective view showing a configuration of a rotor in a second embodiment of the invention.
Figure 5:
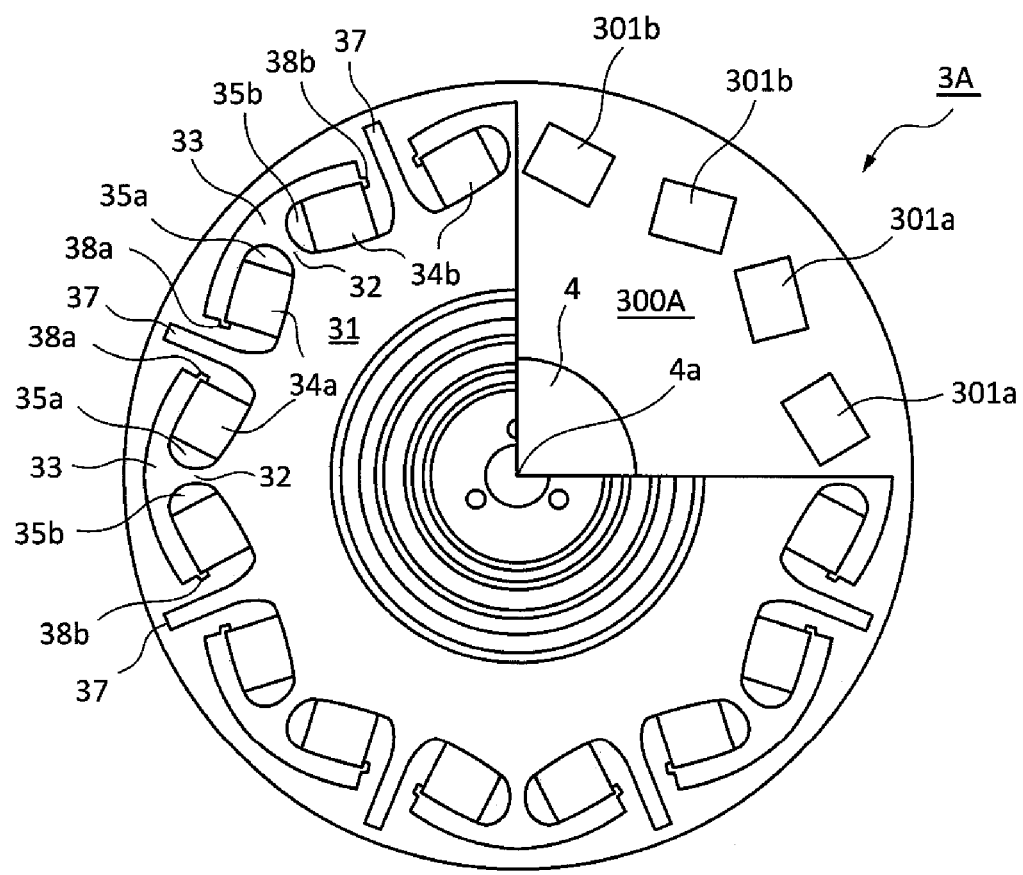
FIG. 5 is a front view showing the configuration of the rotor in the embodiment.

FIG. 4 is a perspective view showing a configuration of a rotor 3A in a second embodiment of the invention. Also, FIG. 5 is a front view of the rotor 3A seen from the direction of the rotation center axis 4a. FIGS. 4 and 5 each show a configuration of the rotor 3A with one portion thereof cut out by two planes perpendicular to the rotation center axis 4a, for easy understanding of the configuration of the rotor 3A. Also, in FIGS. 4 and 5, the same signs are given to portions identical to the portions shown in FIGS. 2 and 3, thus omitting a description thereof.

In the rotor 3A in this embodiment, intermediate plates 300A each have holes 301a and 301b, different in shape or size from the magnet embedding holes 35a and 35b, at least a partial region in each of which is opposed to a region in each respective magnet embedding hole 35a and 35b of the rotor steel material. More particularly, the holes 301a and 301b have a shape and size such that each hole includes one portion of each of the permanent magnets 34a and 34b embedded in the magnet embedding hole 35a and 35b, and that the remaining portion of each permanent magnet 34a and 34b protrudes outside the hole.

The intermediate plates 300A in this embodiment, as they have the holes 301a and 301b, are inferior in strength to the intermediate plates 300 of the first embodiment. However, as the holes of the intermediate plates 300A are smaller than holes such as are provided in the rotor steel plates of the heretofore known example, strength high enough to support the rotor can be obtained in the intermediate plates 300A. Also, in this embodiment, the intermediate plates 300A function as restraining the permanent magnets 34a and 34b from moving in the rotor rotation axis direction. Consequently, depending on the structure of the rotor 3A, it may be easy to assemble the rotor 3A. Furthermore, the rotor 3A according to this embodiment has an advantage in the aspect of cooling too. That is, the rotor 3A, being such that the magnet embedding holes 35a and 35b in the rotor steel material on either side of each intermediate plate 300A communicate with the other respective magnet embedding holes via the holes 301a and 301b of the intermediate plates 300A, is well ventilated in the rotation axis direction, and is advantageous to cooling, in particular, to magnet cooling. Consequently, it is possible to ease the regulations on motor capacity by employing the rotor 3A according to this embodiment.

Third Embodiment

Figure 6:
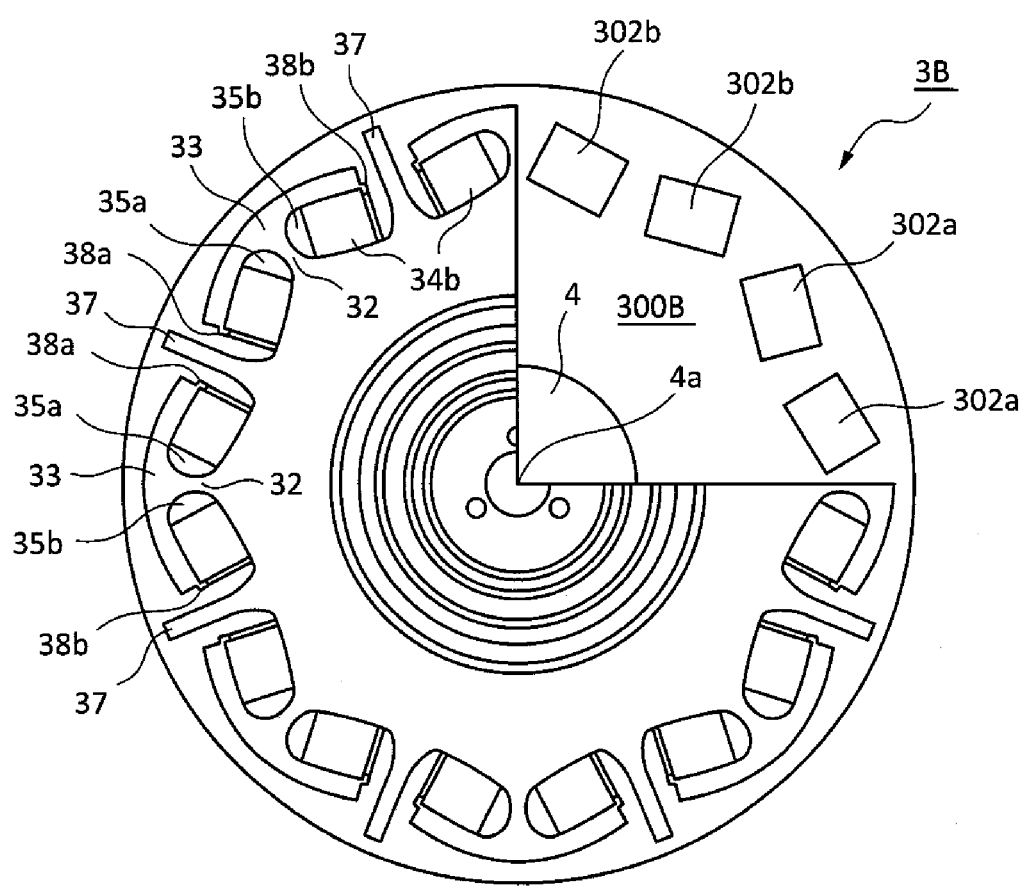
FIG. 6 is a front view showing a configuration of a rotor in a third embodiment of the invention.
Figure 7A:
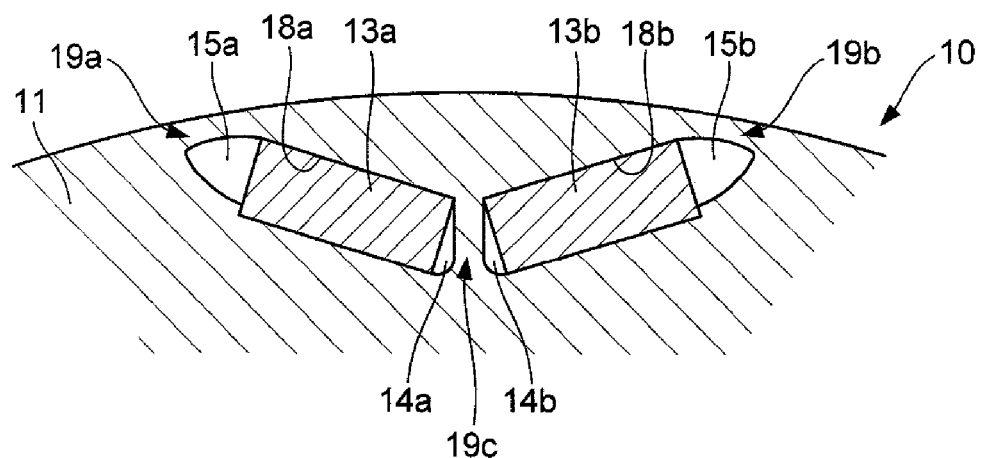
FIGS. 7A, 7B and 7C show diagrams showing configurations of a rotor of a heretofore known embedded permanent magnet type rotating electric machine.
Figure 7B:
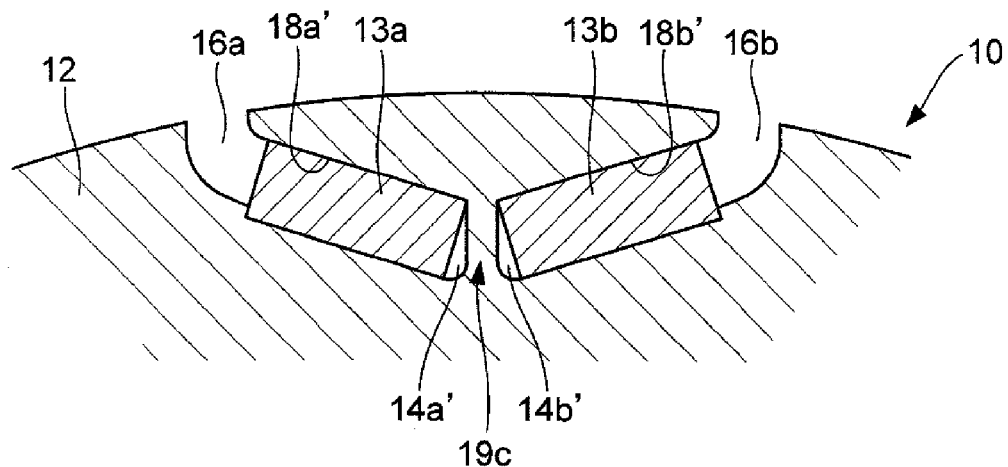
Figure 7C:
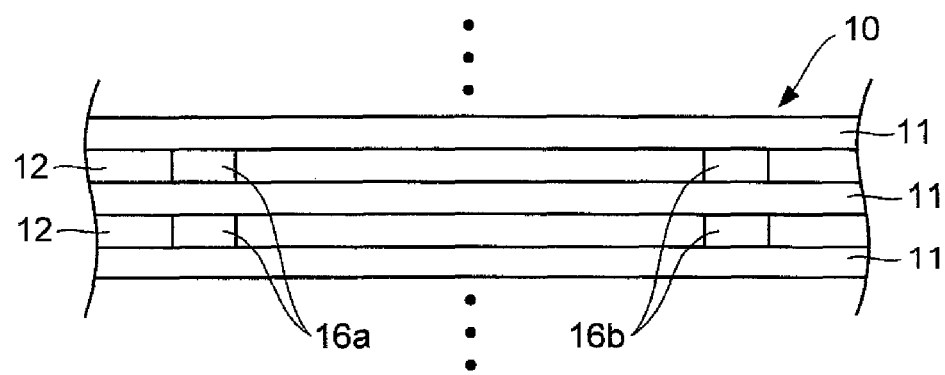

FIG. 6 is a front view of a rotor 3B in a third embodiment of the invention seen from the rotation center axis 4a. FIG.

6 shows a configuration of the rotor 3B with one portion thereof cut out by two planes perpendicular to the rotation center axis 4a, for easy understanding of the configuration of the rotor 3B. Also, in FIG. 6, the same signs are given to portions identical to the portions shown in FIG. 3, thus omitting a description thereof.

The rotor 3B in this embodiment has intermediate plates 300B in which holes are made, in the same way as in the second embodiment. However, in this embodiment, holes 302a and 302b provided in the intermediate plates 300B have a shape and size such that the permanent magnets 34a and 34b embedded in the magnet embedding holes 35a and 35b can be inserted in the holes 302a and 302b.

In this embodiment too, it is possible to obtain the same advantages as in the second embodiment. Also, in this embodiment, the intermediate plates 300B do not prevent the permanent magnets 34a and 34b from moving in the rotor rotation axis direction. Consequently, depending on the structure of the rotor 3B, it is possible to simplify the process of assembling the rotor 3B.

REFERENCE SIGNS LIST

3 . . . Rotor, 34a, 34b . . . Permanent magnet, 35a, 35b . . . Magnet embedding hole, 4a . . . Rotation center axis, 31 . . . Core portion, 32 . . . Center bridge, 33 . . . Outer peripheral edge portion, 37 . . . q-axis projection, 38a, 38b . . . Positioning projection, 300, 300A, 300B . . . Intermediate plate, 301a, 301b, 302a, 302b . . . Hole.

What is claimed is:

1. An embedded permanent magnet type rotating electric machine which has one pole configured of two permanent magnets and has a plurality of poles of permanent magnets embedded in a rotor, wherein
    one or a plurality of disk-shaped intermediate plates, an outer periphery of which is substantially circular, are each disposed in an intermediate position between adjacent rotor steel materials in a rotor axis direction; wherein
    an outside diameter of the intermediate plates extends farther in a radial direction, with respect to the rotor axis direction, than an outermost edge of the rotor steel materials.

2. The embedded permanent magnet type rotating electric machine according to claim 1, wherein
    magnet embedding holes in each of the rotor steel materials, which house the permanent magnets, communicate with a rotor outer periphery.

3. The embedded permanent magnet type rotating electric machine according to claim 1, wherein
    the intermediate plates are configured from a metal material.

4. The embedded permanent magnet type rotating electric machine according to claim 3, wherein
    the metal material configuring the intermediate plates is iron-based.

5. The embedded permanent magnet type rotating electric machine according to claim 4, wherein
    a non-magnetic film is formed on a surface of the intermediate plates.

6. The embedded permanent magnet type rotating electric machine according to claim 5, wherein
    the non-magnetic film is non-conductive.

7. The embedded permanent magnet type rotating electric machine according to claim 4, wherein
    a non-magnetic thin plate is disposed on a side in the rotor axis direction of each intermediate plate.

8. The embedded permanent magnet type rotating electric machine according to claim 7, wherein
    the non-magnetic thin plate is non-conductive.

9. The embedded permanent magnet type rotating electric machine according to claim 1, wherein
    the intermediate plates each have holes, different in shape and size from magnet embedding holes in the rotor steel materials, at least partial regions of the holes in the intermediate plates being opposed to regions in the magnet embedding holes of the rotor steel materials.

10. The embedded permanent magnet type rotating electric machine according to claim 9, wherein
    the holes in the intermediate plates are holes having a shape and size such that permanent magnets embedded in the magnet embedding holes can be inserted in the holes.

11. The embedded permanent magnet type rotating electric machine according to claim 9, wherein
    the holes in the intermediate plates align with the magnet embedding holes.

12. The embedded permanent magnet type rotating electric machine according to claim 1, wherein
    the intermediate plates each have no hole other than a hole through which to pass a shaft of the rotor.

13. An apparatus, comprising:
    a shaft; and
    a rotor around the shaft;
    the rotor including
        rotor plates arranged radially around the shaft and having magnets in openings in the rotor plates, and
        at least one intermediate plate between at least two of the rotor plates, the intermediate plate having a diameter that extends farther radially, with respect to a rotor axis direction, than an outermost edge of the at least two of the rotor plates.

14. The apparatus of claim 13, wherein the at least one intermediate plate has openings that overlap with the openings in the rotor plates.

15. The apparatus of claim 14, wherein the openings in the at least one intermediate plate are sized to enable the magnets to be inserted through the openings in the at least one intermediate plate into the openings in the rotor plates.

16. The apparatus of claim 13, wherein the at least one intermediate plate is substantially circular.

17. The apparatus of claim 13, comprising a plurality of the intermediate plates spaced at regular intervals along the shaft and separated by the rotor plates.

* * * * *